(12) United States Patent
Alicherry et al.

(10) Patent No.: US 7,466,688 B2
(45) Date of Patent: Dec. 16, 2008

(54) ROUTING AND DESIGN IN K-SHARED NETWORK

(75) Inventors: Mansoor Ali Khan Alicherry, Scotch Plains, NJ (US); Harsha S. Nagesh, New Providence, NJ (US); Chitra A. Phadke, Basking Ridge, NJ (US); Viswanath Poosala, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 924 days.

(21) Appl. No.: 10/656,497

(22) Filed: Sep. 5, 2003

(65) Prior Publication Data

US 2005/0063309 A1 Mar. 24, 2005

(51) Int. Cl.
*H04L 12/28* (2006.01)
*H04J 1/16* (2006.01)
*G08C 15/00* (2006.01)
*G06F 11/00* (2006.01)

(52) U.S. Cl. .................. 370/351; 370/222; 370/238; 709/220

(58) Field of Classification Search ......... 370/216–238, 370/351–395, 401–474; 709/238–239
See application file for complete search history.

(56) References Cited

U.S. PATENT DOCUMENTS

| | | | | |
|---|---|---|---|---|
| 5,892,819 | A * | 4/1999 | Stumer | 379/211.02 |
| 6,023,501 | A * | 2/2000 | Wakamatsu | 379/114.02 |
| 6,141,318 | A * | 10/2000 | Miyao | 370/217 |
| 7,023,806 | B1 * | 4/2006 | Gunluk | 370/238 |
| 7,058,012 | B1 * | 6/2006 | Chen et al. | 370/222 |
| 2002/0073393 | A1 * | 6/2002 | Campbell et al. | 716/12 |
| 2002/0118647 | A1 * | 8/2002 | Maeno | 370/238.1 |
| 2003/0023706 | A1 * | 1/2003 | Zimmel et al. | 709/220 |
| 2003/0099014 | A1 * | 5/2003 | Egner et al. | 359/124 |

OTHER PUBLICATIONS

U.S. Appl. No. 10/392,574, filed Mar. 20, 2003, M.A.K. Alicherry et al.
V. Poosala et al., "FASTeR: Shared Restoration Without Signaling," OFC, pp. 1-4, Mar. 2003.
J.W. Suurballe, "Disjoint Paths in a Network," Networks, John Wiley and Sons, Inc., vol. 4, pp. 125-145, Jun. 1974.
E.L. Lawler, "A Procedure for Computing the K Best Solutions to Discrete Optimization Problems and Its Application to the Shortest Path Problem," Management Science, vol. 18, No. 7, pp. 401-405, Mar. 1972.

* cited by examiner

*Primary Examiner*—Man Phan

(57) ABSTRACT

Techniques for network routing and design are provided. A technique for determining a route for a demand in a network, wherein the network comprises primary paths and secondary paths, and at least two secondary paths may share a given link, comprises the following steps/operations. First, a graph representing the network is transformed. Edges of the graph represent channels associated with paths and nodes of the graph represent nodes of the network. The transformation is performed such that costs associated with the edges reflect costs of using channels in secondary paths. Then, the shortest path between nodes corresponding to the demand is found in the transformed graph. The shortest path represents the least-cost path in the network over which the demand may be routed. When the above route determination steps/operations result in a path with at least one loop, an alternative routing process may be executed so as to determine a loopless path for the demand. Further, integer linear program formulation design techniques are provided.

32 Claims, 5 Drawing Sheets

→ D1 PRIMARY PATH
⇢ D1 BACKUP PATH

NODE N6 DETAILS

FIG. 6

```
┌─────────────────────────────────────┐
│ COMPUTE FINITE NUMBER OF CANDIDATE  │── 602
│ PRIMARY AND BACKUP PATHS FOR THE DEMANDS │
└─────────────────────────────────────┘
              ↓
┌─────────────────────────────────────┐
│      APPLY LINEAR PROGRAM           │── 604
│    FORMULATION TO DESIGN NETWORK    │
└─────────────────────────────────────┘
              ↓
┌─────────────────────────────────────┐
│ SUBMIT CONSTRAINT AND MINIMIZATION  │
│ CRITERIA TO ILP SOLVER TO OBTAIN NUMBER │── 606
│ OF CHANNELS ALLOCATED TO EACH LINK  │
└─────────────────────────────────────┘
```

FIG. 7

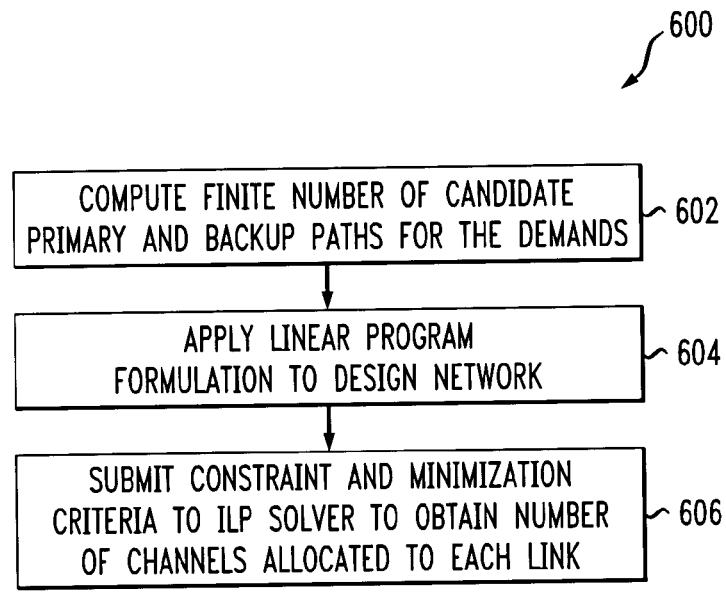

ROUTING AND DESIGN IN K-SHARED NETWORK

CROSS REFERENCE TO RELATED APPLICATIONS

This application relates to the U.S. patent application identified as Ser. No. 10/392,574, entitled "Low Latency Shared Data Path Allocation," filed Mar. 20, 2003 and commonly assigned, the disclosure of which is incorporated by reference herein.

FIELD OF THE INVENTION

The present invention relates to network routing and design techniques and, more particularly, to routing and design techniques for use in accordance with networks such as K-shared networks.

BACKGROUND OF THE INVENTION

The last few years have witnessed the introduction of optical (and electrical) mesh networks as an alternative to synchronous optical network-based (SONET-based) ring networks. One of the key benefits of mesh networks is the improved bandwidth utilization coming from path diversity and shared restoration. Unlike the traditional 1+1 protection technique which reserves 50 percent of the bandwidth for backup paths, shared restoration allows multiple demands to share backup channels and hence reserves less capacity.

However, shared restoration comes at the cost of increased restoration times. Industry standards demand that circuits at the transmission layer be restored within, for example, 50 milliseconds in order to support voice and other SONET traffic. This is easy to achieve with 1+1 protection because traffic is simply switched to a pre-setup backup path on failure and operations resume almost instantaneously. Under shared restoration, since a backup channel may belong to multiple paths, it is not possible to set up the backup paths a priori. Instead, the path is precomputed, but set up after a failure. Set up involves signaling, acknowledgments, and cross connect configurations. This typically takes much longer than the required 50 milliseconds, making the technique non-viable for many applications.

Motivated by these and other deficiencies, a fast shared restoration technique was proposed in the U.S. patent application identified as Ser. No. 10/392,574, entitled "Low Latency Shared Data Path Allocation," filed Mar. 20, 2003 and commonly assigned; and also in C. Phadke et al., "FASTeR: Shared restoration without signaling," OFC, Mar. 2003, the disclosures of which are both incorporated by reference herein. In accordance with the fast shared restoration technique, if the degrees of a shared channel (i.e., the number of shared channels incident on that channel at its ends) are restricted to a finite number (K), then one can in fact pre-establish the backup paths and restore them almost as fast as 1+1 protection. Networks implementing this fast shared restoration technique are referred to as K-shared networks. However, traditional routing and design algorithms may not always work efficiently with networks implementing such a fast shared restoration technique.

Thus, a need exists for routing and design methodologies for use with networks implementing such a fast shared restoration technique and the like.

SUMMARY OF THE INVENTION

The present invention provides network routing and design techniques.

In one aspect of the invention, a technique for determining a route for a demand in a network, wherein the network comprises primary paths and secondary paths, and at least two secondary paths may share a given link, comprises the following steps/operations. First, a graph representing the network is transformed. Edges of the graph represent channels associated with paths and nodes of the graph represent nodes of the network. The transformation is performed such that costs associated with the edges reflect costs of using channels in secondary paths. Then, the shortest path between nodes corresponding to the demand is found in the transformed graph. The shortest path represents the least-cost path in the network over which the demand may be routed.

In another aspect of the invention, when the above route determination steps/operations result in a path with at least one loop, an alternative routing process is executed so as to determine a loopless path for the demand.

In yet another aspect of the invention, integer linear program (ILP) formulation design techniques are provided. For instance, a technique for designing a K-shared network based on a set of one or more demands comprises the following steps/operations. Candidate primary paths and candidate secondary paths are computed based on the set of one or more demands. At least two candidate secondary paths may share a given channel and the number of shared channels incident on another channel is a finite number K. An integer linear program formulation is applied to the computed candidate primary paths and candidate secondary paths. The integer linear program formulation applied to the computed candidate primary paths and candidate secondary paths is then solved so as to generate a K-shared network design.

While the routing and design techniques of the present invention may be employed in a variety of network types, they are particularly well-suited for implementation in accordance with K-shared networks.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 is a flow diagram illustrating a K-shared network design methodology according to an embodiment of the present invention; and FIG. 7 is a block diagram illustrating a generalized hardware architecture of a computer system suitable for implementing an automated K-shared routing and design system according to an embodiment of the present invention.

DETAILED DESCRIPTION OF THE PREFERRED EMBODIMENTS

Figure 1A:
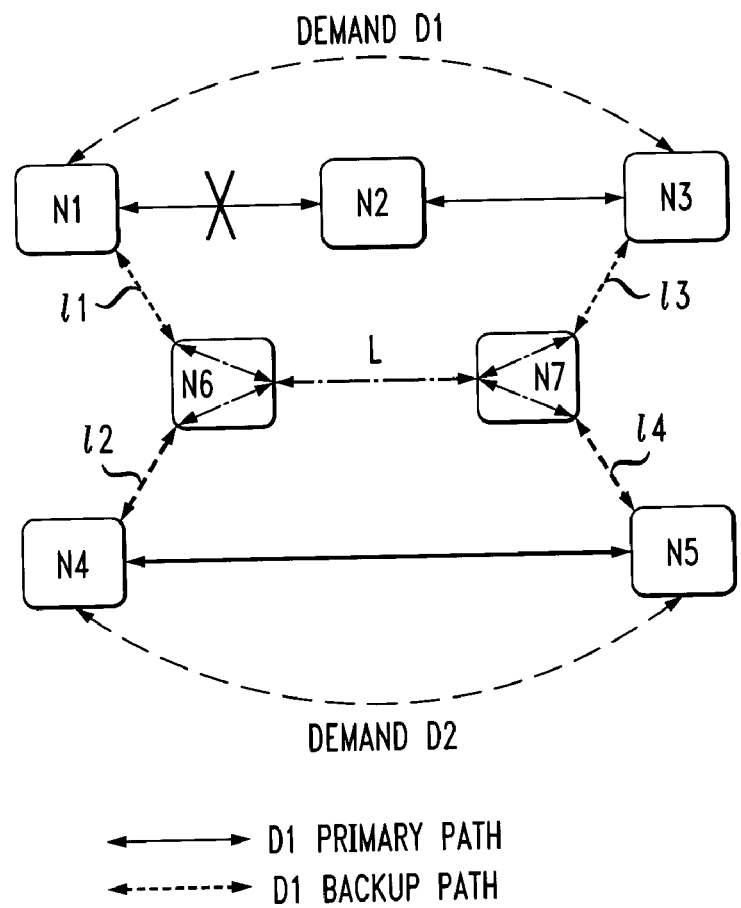
FIGS. 1A and 1B are diagrams illustrating a K-sharing technique for fast restoration in a network.

The following description will illustrate the invention in the context of an exemplary optical network. It should be understood, however, that the invention is not necessarily limited to use with any particular type of network. The invention is instead more generally applicable to any environment in which it is desirable to perform efficient demand routing and network design. Thus, by way of example only, the techniques of the invention may also be applied to circuit-switched networks such as SONET and multi-protocol label switching (MPLS) networks. Also, it is to be further appreciated that the present invention may be used to compute paths for optical burst switching.

As illustratively used herein, a "channel" may be a wavelength in an optical network, a "link" may couple two nodes and may include one or more channels, and a "path" may include one or more links.

As will be evident from the illustrative embodiments described herein below, the present invention provides several advantageous contributions. For example, the invention provides an optimal routing methodology for K-shared networks that minimizes the resources used for sharing. Also, the invention provides an efficient heuristic routing methodology that proves that loopless routing in a K-shared network is NP-Hard. The invention also provides an integer linear program (ILP) formulation of the network design problem that minimizes the capacity required. Experimental results show that K-shared networks offer nearly as much bandwidth savings as unrestricted sharing, even for small values of K, e.g., where K is four or less.

For the sake of convenience, the remainder of the detailed description will be divided into the following sections: (I) K-shared Networks; (II) Routing in K-shared Networks; (III) Design of K-shared Networks; and (IV) Illustrative Hardware Implementation.

I. K-Shared Networks

In this section, the K-sharing technique for fast restoration is described. It is assumed that the network comprises bi-directional optical links interconnected by optical cross-connects (OXC) in an arbitrary mesh topology. However, the description applies equally well to electrical mesh networks. Each link is assumed to have at most m wavelength channels. Traffic comprises point-to-point unit wavelength demands which are to be routed over the channels. A path is set up by configuring the cross-connects to connect an incoming channel to the next channel in the path. In the traditional path restoration techniques, each demand has a dedicated primary path and a precomputed backup (secondary) path, and the backup paths of multiple demands may have common channels. Clearly, only one of these demands with common channels can be reverted to the backup path on a failure. In link restoration, there will be a backup path per primary link, but K-sharing also works for that case. On a node or channel failure in the primary path of a demand, its backup path is established by sending signals to all the cross-connects along the path. The traditional protocol for this involves the following steps: send signals to the OXCs along the backup path, process signals and setup cross-connects, and wait for acknowledgments (ACKs). Given the size of the network and the non-trivial latencies in OXCs, this can take considerable time.

Figure 1B:
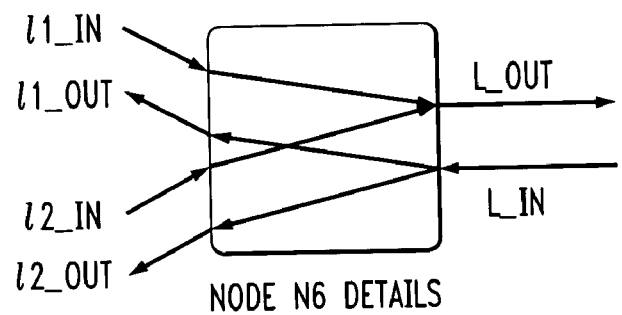

The K-sharing technique was designed to eliminate signaling and cross-connect latencies from the critical path of restoration. It works as follows. Even before any failure occurs, all the backup paths are set up using a specialized Select-Multicast feature of the OXCs. This is explained through the scenario illustrated in the context of FIGS. 1A and 1B where two demands D1 and D2 overlap in their bidirectional backup paths. The backup channels 11, 12 from the two backup paths are incident on node N6 and merge onto a single backup channel L. This node would be configured to behave as follows: (a) the node sends the signal from the first channel among 11 and 12 with data on it on to L, while blocking the remaining channel (Select); and (b) the light coming on L into N6 is always broadcast onto 11 and 12 (Multicast). On a failure in a primary path, say of D1, the end-nodes of D1 (N1, N3) transmit data right away on the backup path. If this was the first failure among D1 and D2, the signal will reach the intended destination after successive multicasts, while other demands are prevented from using the backup channels through blocking. If this happens after D2 had failed and been restored, the light on 11 would be blocked at N6 and will never reach the destination, as expected for any shared restoration technique.

Essentially, blocking replaces the more complex cross-connect setups and multi-casting eliminates the need to process address headers in the internal nodes. The latter is useful for reducing delays as well as in all-optical networks where the intermediate nodes do not have capacity to interpret data. Since no cross-connects are setup and signals processed, the time to restore is roughly equal to the backup path latency.

In practice, it may not be easy to build an OXC with a high Select-Multicast degree (or, simply, degree where no confusion arises), i.e., the maximum number of channels connected to a single channel. The maximum degree allowed in a given network is in fact the K in K-sharing. Many current OXCs provide functionality which can be easily adapted to implement a Select-Multicast feature. However, the degree supported for those applications is typically just two and extending this degree to four might mean further doubling the number of mirrors in a micro electrical-mechanical system (MEMS) architecture. On the other hand, a small degree has a negative impact on sharing because certain backup path configurations would be disallowed. Note that, since each backup channel may already belong to multiple demands, this does not restrict the number of demands sharing a backup channel to K.

II. Routing in K-Shared Networks

When a new demand arrives, its primary and backup paths need to be computed. The methodologies for traditional shared restoration are well known, see, e.g., J. W. Suurbaale, "Disjoint paths in a network," Networks, vol. 4, June 1974, the disclosure of which is incorporated by reference herein. However, the backup paths computed by these traditional methodologies may violate the maximum degree constraint in a K-shared network. In this section, an optimal least-cost routing methodology is illustrated for K-shared networks, which minimizes the number of channels used for backup at least-cost.

Let G=(V, E) be the network, where V is the set of OXC nodes and E is the set of wavelength division multiplexing (WDM) links connecting the nodes. Each link l=(u, v) carries m channels $l^1, l^2, \ldots, l^m$. For a channel $l^i$ incident on a node u, its degree at u is defined to be the number of backup channels connected to it at u.

Now, consider routing a demand d between nodes s (source node) and t (destination node). A channel $l^i$ can be in one of the following states at any given time in regard to d and is assigned a cost $c(l_i)$ as stated:

1) The channel is part of the primary path of a demand and hence not available.
2) The channel is a backup channel for a demand sharing a risk group with d (e.g., having common links in primary paths) and hence not available.
3) The channel is a backup channel, but not for any demand sharing a risk group with d. The channel can be used for d, but the next channel in the path should either be one of the channels it is already connected to, or both channels should have degrees less than K at their common node. A cost of zero is attributed to using that channel in this case.
4) The channel is not used by any path. It can be used for the backup without any restrictions, but at a cost of one channel.

Figure 2A:
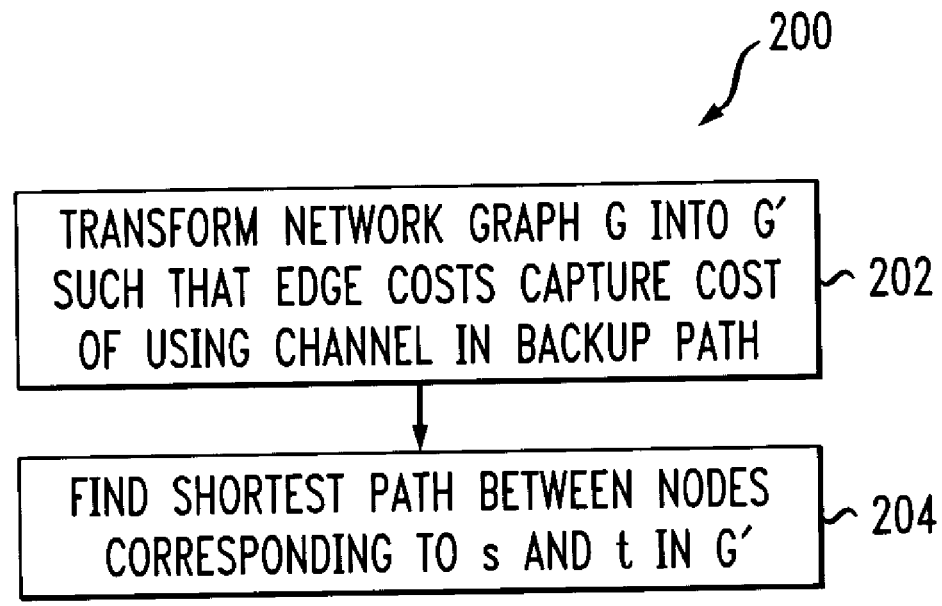
FIG. 2A is a flow diagram illustrating a routing methodology according to an embodiment of the invention.

Referring now to FIG. 2A, a flow diagram illustrates a routing methodology according to an embodiment of the invention. Routing methodology 200 comprises the following steps. In step 202, transform the graph G into G'=(V', E') such that edge costs capture the cost of using the channel in a backup path. Then, in step 204, find the shortest path between the nodes corresponding to s and t in G'. This will directly yield the cheapest path in the network.

Figure 2B:
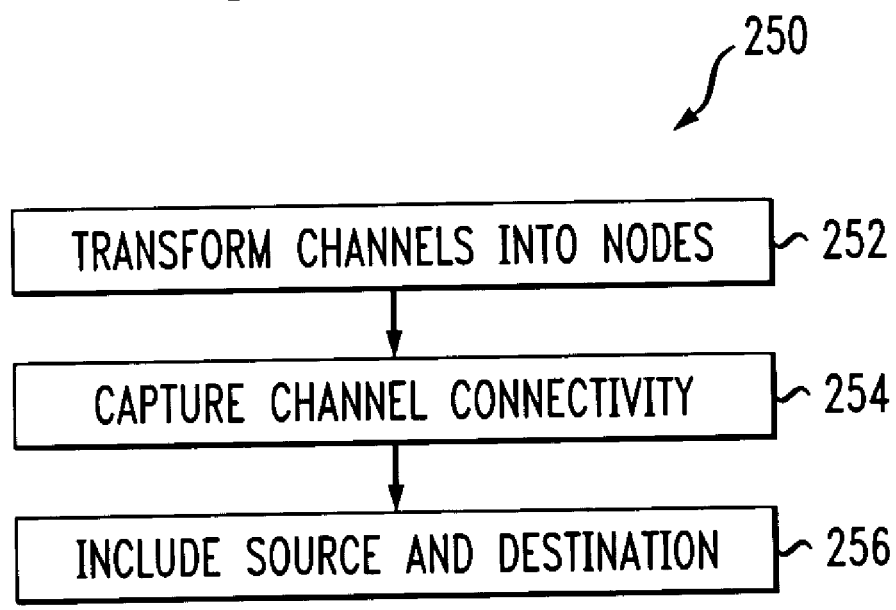
FIG. 2B is a flow diagram illustrating a transformation process for use in a routing methodology according to an embodiment of the invention.

Referring now to FIG. 2B, a flow diagram illustrates a transformation process (e.g., step 202) for use in a routing methodology according to an embodiment of the invention. Transformation process 250 involves the following operations:

1) Transform channels into nodes (step 252): Consider any link l=(u, v) and channel $l^i$ in it. Create two nodes u(l, i) and v(l, i) and an edge between them. The cost of this edge is the cost $c(l_i)$ as stated above.
2) Capture channel connectivity (step 254): Consider any pair of channels $l^i$ and $m^j$ incident on a node u. If these channels are already connected at u, then add a zero-cost edge between u(l, i) and u(m, j). Otherwise, if both channels have degrees less than K at u, then connect them with an edge costing $\in (0 < \in << 1)$. This cost is to prefer existing connections over new ones, because a new connection would increase the degree of the channel.
3) Include source, destination (step 256): Create nodes s' and t' corresponding to s, t. Consider channel $l_i$ in link l=(s, x) incident on s. If its degree at s is less than K, connect s' and s(l, i) at zero cost. Repeat with t.

The complexity of this least-cost methodology is $O(em^2D\log(em))$, where e is the number of links in G and D is the average nodal degree.

The transformation may be illustrated as follows.

Figure 3A:
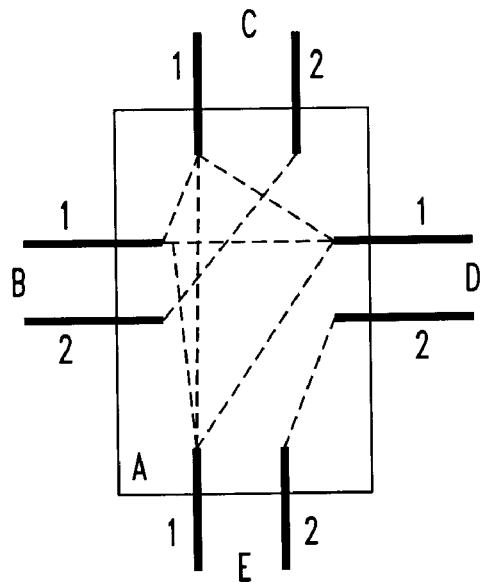
FIGS. 3A and 3B are diagrams illustrating a transformation process for use in a routing methodology according to an embodiment of the invention.

FIG. 3A shows node A connected to four physical nodes B, C, D, and E. Let K=3 and number of channels m=2. The first channels of all of the links are connected to each other through the switch of node A. The second channel of link AB is connected to the second channel of AC, and the second channel of AD is connected to second channel of AE.

Figure 3B:
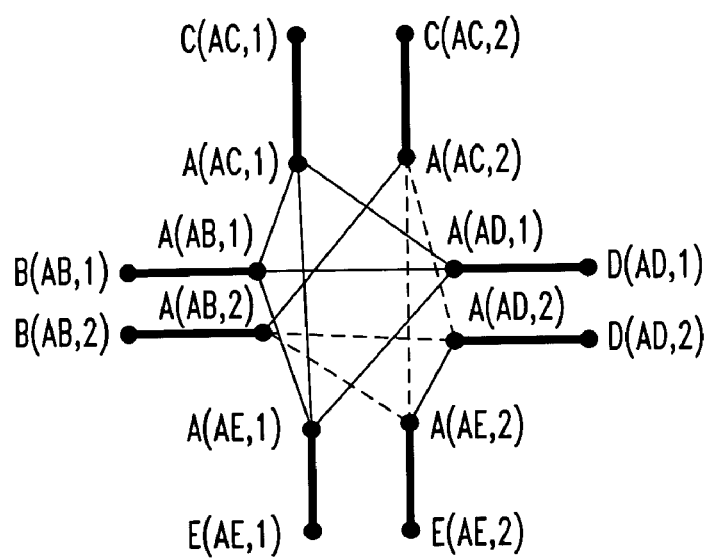

FIG. 3B shows the graph transformation. The nodes corresponding to the channels already connected in the network are joined with links (solid lines) of zero cost (e.g., step 252). The nodes corresponding to the second channel that are not connected in the switch are connected using links (dashed lines) of cost $\in$ since their degrees (2) are less than K (e.g., step 254).

Figure 4:
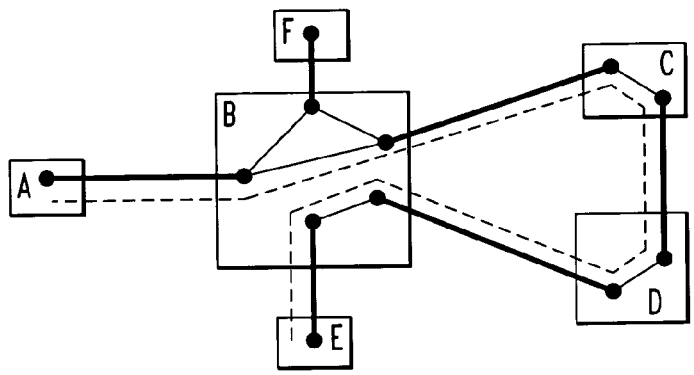
FIG. 4 is a diagram illustrating a network with a looped path.

While the above methodology computes a least-cost backup path, it is possible that the resulting path may visit the same node more than once. FIG. 4 shows an example for K=2 for a path from A to E. Only shared channels are shown here. Since the channel in link AB is already connected to two channels BF and BC, it cannot be connected to another channel BE. So the routing methodology takes the path A-B-C-D-B. Such paths are often not acceptable in practice for several reasons. First, they are unduly long and may introduce excessive latencies for delay-sensitive traffic. Second, all-optical networks are designed such that a signal is transmitted with sufficient power between any two nodes only as long as the paths have a finite maximum length. Since loops violate this property, they are not permissible.

In the above example, an alternative solution would have been to use another channel in the link AB for the backup path and connect it to BE to get the path A-B-E. However, the general problem of finding such loopless paths is non-trivial. That is, it may be proven that, given a K-shared network, computing the shortest path without visiting the same node twice is NP-Hard.

Next, an efficient heuristic loopless routing methodology for this problem is provided, which should be invoked when the least-cost routing methodology results in a path with loops.

Figure 5A:
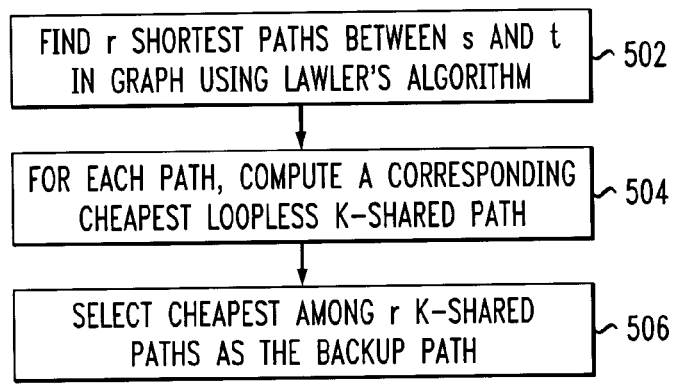
FIG. 5A is a flow diagram illustrating a routing methodology according to another embodiment of the invention.

Referring now to FIG. 5A, a flow diagram illustrates a routing methodology according to another embodiment of the invention. Loopless routing methodology 500 first finds r shortest paths between s and t in the graph G using the well-known Lawler's algorithm, in step 502. Lawler's algorithm is described in E. L. Lawler, "A Procedure for Computing the K Best Solutions to Discrete Optimization Problems and Its Application to the Shortest Path Problem," *Management Science*, vol. 18, no. 7, pp. 401-405, March 1972, the disclosure of which is incorporated by reference herein. The complexity of this operation is $O(rn^3)$, where n is the number of nodes.

For each of these paths, in step 504, the methodology then computes a corresponding cheapest loopless K-shared path as described below. Finally, in step 506, the methodology selects the cheapest among these r K-shared paths as the backup path.

Figure 5B:
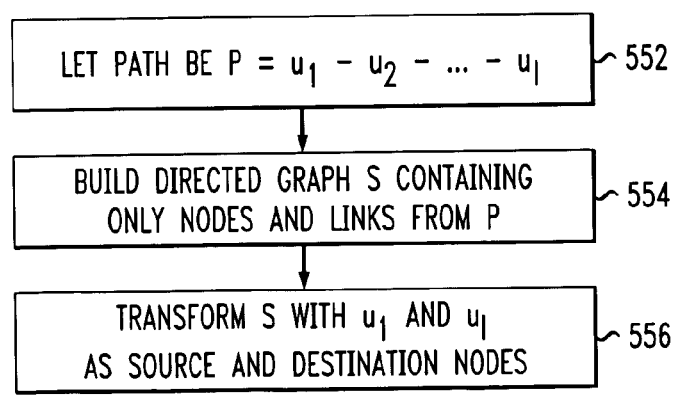
FIG. 5B is a flow diagram illustrating a process for computing a corresponding cheapest loopless K-shared path for use in a routing methodology according to an embodiment of the invention.

Referring now to FIG. 5B, a flow diagram illustrates a process for computing a corresponding cheapest loopless K-shared path (e.g., step 504) for use in a routing methodology according to an embodiment of the invention. Computation process 550 involves the following operations in order to find the cheapest K-shared path corresponding to a given path.

In step 552, let the path be $P=u_1-u_2-\ldots-u_j$. In step 554, build a directed graph S containing only the nodes and links from P. The direction of a link is in the direction of the path. Then, in step 556, transform S using the transformation used in the least-cost routing methodology described above, with $u_1$ and $u_j$ as the source, destination nodes. Also, for the purpose of the transformation, the degrees of the channels are taken from G rather than S. Then, the shortest path from $u_1'$ to $u_j'$ in the transformed graph is the cheapest K-shared path without loops corresponding to P. A proof of correctness may come from the fact that links are directed in the direction of the path P.

III. Design of K-Shared Networks

A goal of the network design problem is to assign the minimum capacity (total number of channels) to the links in order to carry a given set of demands. Design methodologies for traditional shared restoration do not work for this case because they may exceed the degree K at some nodes.

In this section, an integer linear program based methodology is provided for designing K-shared networks. Referring now to FIG. 6, a flow diagram illustrates a K-shared network design methodology according to an embodiment of the present invention. Design methodology 600 begins in step 602 by computing a finite number of candidate primary and backup paths for the demands. Doing this outside of the linear program reduces the number of variables and prunes unnecessary paths. Let $(P_1^d, B_1^d), (P_2^d, B_2^d), \ldots, (P_{n_d}^d, B_{n_d}^d)$ be the pairs of paths for demand d. Next, in step 604, the following formulation is applied to design the network.

The variables used in the linear program are:

$P_{i,d}$ 1 if the path $P_i^d$ is used for d (else, 0)

$b_{i,d,l,\lambda}$ 1 if the path $B_i^d$ uses channel $\lambda$ on link l $u_{l,\lambda}$ 1 if link l uses channel $\lambda$ for backup $x_l$ Total number of channels used on link l $c_{l_1,\lambda_1,l_2,\lambda_2}$ 1 if channel $\lambda_1$ of link $l_1$ is connected to channel $\lambda_2$ of link $l_2$.

The goal is to minimize the total number of channels used $(\Sigma_l x_l)$ subject to the constraint that $x_l \leq m$, for all l, where m is the number of channels available on a link.

The channels on a link can be used either for primary or for backup:

$$x_l = \sum_{i,d:l \in P_i^d} p_{i,d} + \sum_{\lambda} u_{l,\lambda},$$

for all l

The various constraints may be as follows:

$$\sum_i p_{i,d} = 1, \forall d \quad (1)$$

$$\sum_\lambda b_{i,d,l,\lambda} = p_{i,d}, \forall (i, d) \text{ and } l \in B_i^d \quad (2)$$

$$B_{i,d,l,\lambda} \leq u_{l,\lambda}, \forall l, \lambda, (i, d): l \in B_i^d \quad (3)$$

$$B_{i_1,d_1,l,\lambda} + B_{i_2,d_2,l,\lambda} \leq 1, \forall l, \lambda, i_1, i_2, d_1, d_2, d_2: d_1 \neq d_2$$

and paths $P_{i_1}^{d_1}$ and $P_{i_2}^{d_2}$ has a common link (4)

$$B_{i,d,l_1,\lambda_1} + B_{i,d,l_2,\lambda_2} \leq 1 + c_{l_1,\lambda_1,l_2,\lambda_2}, \forall l_1, \lambda_1, l_2, \lambda_2, i, d: \quad (5)$$

$l_1, l_2 \in B_i^d, (l_1, l_2)$ adjacent $$c_{l_1,\lambda_1,l_2,\lambda_2} = c_{l_2,\lambda_2,l_1,\lambda_1}, \forall l_1, \lambda_1, l_2, \lambda_2 \quad (6)$$

$$\sum_{l_1,\lambda_2} c_{l,\lambda,l_1,\lambda_1} \leq k, \forall l, \lambda \quad (7)$$

$$p_{i,d} \in \{0, 1\} \quad (8)$$

$$b_{i,d,l,\lambda} \in \{0, 1\} \quad (9)$$

Constraint set (1) ensures that capacity is allocated for all the demands. Constraint set (2) ensures that primary-backup path pairs are used together for a demand. Constraint set (3) ensures that if any backup path uses a channel on a link, that channel is only allocated for backup. Constraint set (4) ensures that demands sharing the backup channel are link disjoint in the primary. Constraint set (5) ensures that connections are setup between the channels when a backup path goes through them. Constraint set (6) ensures that connections in a K-shared switch are bidirectional. Constraint set (7) ensures that no more than K connections are made for each channel. Finally, constraint sets (8) and (9) enforce the integrality on the primary and backup allocation.

Lastly, in step 606, these constraints and minimization criterion are submitted to an ILP solver to obtain the number of channels allocated to each link, and to obtain the paths and channels allocated for each demand. These results are considered the design of the K-shared network. The design may then be deployed.

In one illustrative embodiment, a K-shared network was designed using the methodologies described herein, which were written in AMPL language as described in R. Fourer, et al., "AMPL-A Modeling Language for Mathematical Programming," Boyd & Fraser, 1993, the disclosure of which is incorporated by reference herein, and solved using CPLEX-ILP solver from ILOG, Inc.

IV. Illustrative Hardware Implementation

Referring now to FIG. 7, a block diagram illustrates a generalized hardware architecture of a computer system suitable for implementing an automated K-shared routing and design system, according to an embodiment of the present invention. More particularly, it is to be appreciated that any node in the network and/or any dedicated routing and/or design system in the network may implement such a computing system 700 to perform the methodologies of the invention. Of course, it is to be understood that the invention is not limited to any particular computing system implementation.

In this illustrative implementation, a processor 702 for implementing at least a portion of the methodologies of the invention is operatively coupled to a memory 704, input/output (I/O) device(s) 706 and a network interface 708 via a bus 710, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the design inputs used by a design system of the invention to generate a network. Alternatively, the design inputs could be read into the design system from a diskette or from some other source (e.g., another computer system) connected to the computer bus 710. Also, inputs to the routing methodologies may be obtained in accordance with the one or more input devices. The output devices may be one mechanism for a user or other computer system to be presented with results of the routing and/or design methodologies.

Still further, the phrase "network interface" as used herein is intended to include, for example, one or more devices capable of allowing the computing system 700 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of routing and design systems, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 702.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of determining a route for a demand in a network, wherein the network comprises primary paths and secondary paths, and at least two secondary paths may share a given link, the method comprising the steps of:

transforming a graph representing the network, wherein edges of the graph represent channels associated with paths and nodes of the graph represent nodes of the network, the transformation being performed such that costs associated with the edges reflect costs of using channels in secondary paths; and finding the shortest path between nodes corresponding to the demand in the transformed graph, the shortest path representing the least-cost path in the network over which the demand may be routed.

2. The method of claim 1, wherein the graph transformation step further comprises the step of transforming channels into nodes of the graph.

3. The method of claim 2, wherein a path comprises one or more links and a link l between two nodes u and v is represented as (u, v) and a channel in the link is represented as $l^i$ such that the step of transforming channels into nodes further comprises creating two nodes u(l, i) and v(l, i) and an edge between them.

4. The method of claim 3, wherein the cost of the created edge is a function of the channel.

5. The method of claim 4, wherein the graph transformation step further comprises the step of representing channel connectivity.

6. The A method of determining a route for a demand in a network, wherein the network comprises primary paths and secondary paths, and at least two secondary paths may share a given link, the method comprising the steps of:

transforming a graph representing the network, wherein edges of the graph represent channels associated with paths and nodes of the graph represent nodes of the network, the transformation being performed such that costs associated with the edges reflect costs of using channels in secondary paths, wherein the cost of the created edge is a function of the channel; and finding the shortest path between nodes corresponding to the demand in the transformed graph, the shortest path representing the least-cost path in the network over which the demand may wherein the graph transformation step further comprises the steps of transforming channels into nodes of the graph and representing channel connectivity;

wherein a path comprises one or more links and a link l between two nodes u and v is represented as (u, v) and a channel in the link is represented as $l^i$ such that the step of transforming channels into nodes further comprises creating two nodes u(l,i) and v(l,i) and an edge between them:

wherein a pair of channels maybe represented as $l^i$ and $m^j$ incident on a node u such that the channel connectivity representation step further comprises:

when the pair of channels are already connected at u, adding a zero-cost edge between u(l, i) and u(m, j); and otherwise, when both of the channels have degrees less than a value K at u, connecting them with an edge having a cost ∈, where cost ∈ is greater than zero and substantially smaller than one.

7. The method of claim 6, wherein the cost ∈ is selected to prefer existing connections over new connections.

8. The method of claim 7, wherein the graph transformation step further comprises the step of including the source nodes and the destination node t associated with the demand in the transformed graph.

9. The method of claim 8, wherein the step of including the source node and the destination node in transformed graph further comprises creating node s' corresponding to s such that when channel $l^i$ in link (s, x) is incident on s and when the degree of link (s, x) at s is less than K, s' and s(l,i) are connected at zero cost.

10. The method of claim 8, wherein the step of including the source node and the destination node in transformed graph further comprises creating node t' corresponding to t such that when channel $l^i$ in link (x, t) is incident on t and when the degree of link (x, t) at t is less than K, t' and t(t, i) are connected at zero cost.

11. The method of claim 1, wherein when the route determination steps result in a path with at least one loop, executing an alternative routing process so as to determine a loopless path for the demand.

12. The method of claim 11, wherein the alternative routing process further comprises the step of finding r shortest paths between the source node and the destination node associated with the demand in the graph.

13. The method of claim 12, wherein the alternative routing process further comprises the step of, for each of the r shortest paths, computing a corresponding least-cost loopless path.

14. The method of claim 13, wherein the alternative routing process further comprises the step of selecting the least-cost path among the r paths as a secondary path for the demand.

15. The method of claim 1, wherein the transforming and finding steps are used to compute one or more paths for optical burst switching.

16. A method of designing a K-shared network based on a set of one or more demands, comprising the steps of:
   computing candidate primary paths and candidate secondary paths based on the set of one or more demands, wherein at least two candidate secondary paths may share a given channel and the number of shared channels incident on another channel is a finite number K;
   applying an integer linear program formulation to the computed candidate primary paths and candidate secondary paths; and
   solving the integer linear program formulation applied to the computed candidate primary paths and candidate secondary paths so as to generate a K-shared network design.

17. Apparatus for determining a route for a demand in a network, wherein the network comprises primary paths and secondary paths, and at least two secondary paths may share a given link, the apparatus comprising:
   a memory; and
   at least one processor coupled to the memory and operative to: (i) transform a graph representing the network, wherein edges of the graph represent channels associated with paths and nodes of the graph represent nodes of the network, the transformation being performed such that costs associated with the edges reflect costs of using channels in secondary paths; and (ii) find the shortest path between nodes corresponding to the demand in the transformed graph, the shortest path representing the least-cost path in the network over which the demand may be routed.

18. The apparatus of claim 17, wherein the graph transformation operation further comprises transforming channels into nodes of the graph.

19. The apparatus of claim 18, wherein a path comprises one or more links and a link l between two nodes u and v is represented as (u, v) and a channel in the link is represented as $l^i$ such that the step of transforming channels into nodes further comprises creating two nodes $u(l, i)$ and $v(l, i)$ and an edge between them.

20. The apparatus of claim 19, wherein the cost of the created edge is a function of the channel.

21. The apparatus of claim 20, wherein the graph transformation operation further comprises representing channel connectivity.

22. Apparatus for determining a route for a demand in a network, wherein the network comprises primary paths and secondary paths, and at least two secondary paths may share a given link, the apparatus comprising:
   a memory; and
   at least one processor coupled to the memory and operative to: (i) transform a graph representing the network, wherein edges of the graph represent channels associated with paths and nodes of the graph represent nodes of the network, the transformation being performed such that costs associated with the edges reflect costs of using channels in secondary paths, wherein the cost of the created edge is a function of the channel; and (ii) find the shortest path between nodes corresponding to the demand in the transformed graph, the shortest path representing the least-cost path in the network over which the demand may be routed;
   wherein the graph transformation operation further comprises transforming channels into nodes of the graph and representing channel connectivity;
   wherein a path comprises one or more links and a link l between two nodes u and v is represented as (u, v) and a channel in the link is represented as $l^i$ such that the step of transforming channels into nodes further comprises creating two nodes $u(l, i)$ and $v(l, i)$ and an edge between them;
   wherein a pair of channels maybe represented as $l^i$ and $m^j$ incident on a node u such that the channel connectivity representation operation further comprises, when the pair of channels are already connected at u, adding a zero-cost edge between $u(l, i)$ and $u(m,j)$, and otherwise, when both of the channels have degrees less than a value K at u, connecting them with an edge having a cost $\in$, where cost $\in$ is greater than zero and substantially smaller than one.

23. The apparatus of claim 22, wherein the cost $\in$ is selected to prefer existing connections over new connections.

24. The apparatus of claim 23, wherein the graph transformation operation further comprises including the source node s and the destination node t associated with the demand in the transformed graph.

25. The apparatus of claim 24, wherein the operation of including the source node and the destination node in transformed graph further comprises creating node s'corresponding to s such that when channel $l^i$ in link (s, x) is incident on s and when the degree of link (s, x) at s is less than K, s'and s(l, i) are connected at zero cost.

26. The method of claim 24, wherein the operation of including the source node and the destination node in transformed graph further comprises creating node t'corresponding to t such that when channel $l^i$ in link (x, t) is incident on t and when the degree of link (x, t) at is less than K, t'and t(l, i) are connected at zero cost.

27. The apparatus of claim 17, wherein when the route determination operations result in a path with at least one loop, executing an alternative routing process so as to determine a loopless path for the demand.

28. The apparatus of claim 27, wherein the alternative routing process further comprises finding r shortest paths between the source node and the destination node associated with the demand in the graph.

29. The apparatus of claim 28, wherein the alternative routing process further comprises, for each of the r shortest paths, computing a corresponding least-cost loopless path.

30. The apparatus of claim 29, wherein the alternative routing process further comprises selecting the least-cost path among the r paths as a secondary path for the demand.

31. The apparatus of claim 17, wherein the transforming and finding operations are used to compute one or more paths for optical burst switching.

32. Apparatus for designing a K-shared network based on a set of one or more demands, the apparatus comprising:

a memory; and at least one processor coupled to the memory and operative to: (i) compute candidate primary paths and candidate secondary paths based on the set of one or more demands, wherein at least two candidate secondary paths may share a given channel and the number of shared channels incident on another channel is a finite number K; (ii) apply an integer linear program formulation to the computed candidate primary paths and candidate secondary paths; and (iii) solve the integer linear program formulation applied to the computed candidate primary paths and candidate secondary paths so as to generate a K-shared network design.

* * * * *

UNITED STATES PATENT AND TRADEMARK OFFICE
CERTIFICATE OF CORRECTION

PATENT NO. : 7,466,688 B2
APPLICATION NO. : 10/656497
DATED : December 16, 2008
INVENTOR(S) : M. A. K. Alicherry et al.

It is certified that error appears in the above-identified patent and that said Letters Patent is hereby corrected as shown below:

Claim 6, col. 10, line 15, please delete "The" within the language "The A method."

Claim 6, col. 10, line 30, please add "be routed;" after "the demand may" and begin a new paragraph beginning with "wherein the graph transformation step . . . ."

Claim 24, col. 12, line 37, please delete "transfonned" and insert --transformed--.

Claim 25, col. 12, lines 39-40, please delete "transfonned" and insert --transformed--.

Claim 26, col. 12, line 48, please replace "at is less than" with --at t is less than--.

Signed and Sealed this

Third Day of March, 2009

JOHN DOLL
*Acting Director of the United States Patent and Trademark Office*